United States Patent
Sturt et al.

(10) Patent No.: US 6,698,816 B1
(45) Date of Patent: Mar. 2, 2004

(54) VARIABLE SUNSCREEN FOR A VEHICLE

(75) Inventors: Alan Sturt, West Bloomfield, MI (US); George Byma, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/232,272

(22) Filed: Aug. 30, 2002

(51) Int. Cl.[7] .................................................. B60J 3/04
(52) U.S. Cl. ..................................... 296/97.3; 296/215
(58) Field of Search .............................. 296/97.1, 97.2, 296/97.3, 97.5, 210, 215; 359/233, 601, 614

(56) References Cited

U.S. PATENT DOCUMENTS

| | | |
|---|---|---|
| 1,589,475 A | 6/1926 | Lowther |
| 1,597,084 A | 8/1926 | Lowther |
| 2,721,759 A | 10/1955 | Tashjian |
| 2,744,783 A | 5/1956 | Peavey |
| 3,128,121 A | 4/1964 | Greig |
| 3,183,033 A | 5/1965 | Stulbach |
| 3,199,114 A | 8/1965 | Malifaud |
| 3,603,672 A | 9/1971 | Bastide |
| 4,040,657 A | 8/1977 | Penzes |
| 4,362,330 A | 12/1982 | Cramer |
| 4,726,620 A | 2/1988 | Takahashi |
| 4,988,139 A | 1/1991 | Yamada |
| 5,714,751 A | 2/1998 | Chen |
| 5,938,268 A | 8/1999 | Wang et al. |
| 6,131,987 A | 10/2000 | Rossiter |
| 6,439,638 B1 * | 8/2002 | Kawasaki et al. .......... 296/97.2 |
| 6,450,560 B1 * | 9/2002 | Sturt et al. .................. 296/97.2 |

* cited by examiner

Primary Examiner—Stephen T. Gordon
Assistant Examiner—Jason Morrow
(74) Attorney, Agent, or Firm—Bill C. Panagos

(57) ABSTRACT

A variable opacity sunscreen. The sunscreen includes sunshade body having a plurality of apertures therethrough. A blade slidable relative to the sunshade body is provided. The blade includes a plurality of apertures and a blade slot therethrough. The sunscreen further includes a lever cooperable with the blade slot to slide the blade relative to the sunshade body so that the apertures and the blade move relative to the apertures in the sunshade body to vary the opacity of a sunscreen across its entire surface or a part thereof.

26 Claims, 3 Drawing Sheets

VARIABLE SUNSCREEN FOR A VEHICLE

BACKGROUND OF THE INVENTION

1. Field of the Invention

The present invention relates to a variable sunscreen for a vehicle in which first and second relatively movable sheet members are provided with selectively alignable opaque and transparent matrices for adjusting the level of opacity of the sunscreen.

2. Background Art

Vehicle sunscreening members, such as sun visors, are required to "block the sun" to improve visibility for the driver, but it may be advantageous at times to have certain percentage visibility through the visor. For example, it may be desirable to see an overhead traffic signal when the sun is directly ahead and low in the sky or, the sun may be showing from one side. At other times, the sun visor may need to be totally opaque.

SUMMARY OF THE INVENTION

The present invention discloses a variable opacity sunscreen including a sun shade body having a plurality of apertures therethrough. A blade slidable relative to the sun shade body is also provided. The blade has a plurality of apertures and a blade slot therethrough. The sunscreen also includes a lever cooperable with the blade slot to slide the blade relative to the sun shade body so that the apertures in the blade move relative to the apertures in the sun shade body to vary the opacity of the sunscreen.

The invention also discloses a variable opacity sunscreen having a sun shade body having a matrix of transparent and opaque portions thereon. The sunscreen also has a blade slidable with respect to the sun shade body. The blade also has a matrix of transparent and opaque portions thereon and a blade slot therethrough. The sunscreen further includes a lever cooperable with the blade slot to slide the blade relative to the sun shade body so that the matrices of transparent and opaque portions move relative to each other to vary the opacity of the sunscreen.

The invention also discloses a variable opacity sunscreen having a body. The sunscreen also has a first panel having a matrix of transparent and opaque portions thereon attachable to the body and a second panel having a matrix of transparent and opaque portions thereon, the second panel retained relative to the first panel. The sunscreen also includes a lever to move one panel relative to the other panel such that the matrices of transparent and opaque portions move relative to each other and vary the opacity of the sunscreen.

The above objects and other objects, features, advantages of the present invention are readily apparent from the following description of the best modes for carrying out the invention when taken in connection with the accompanying drawings.

DETAILED DESCRIPTION OF THE PREFERRED EMBODIMENT(S)

Figure 1:
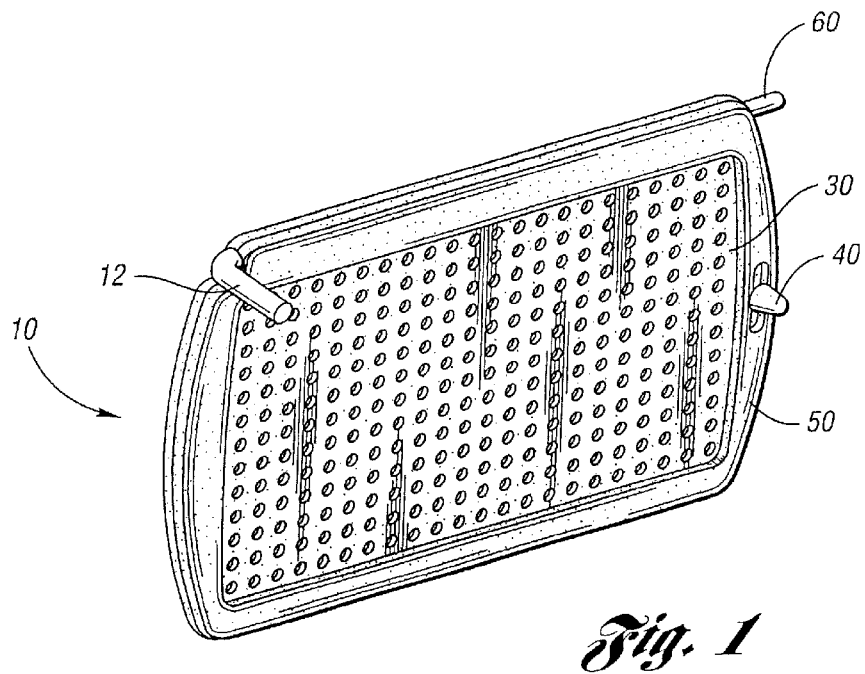
FIG. 1 is a perspective view of one embodiment of the sunscreen of the present invention.
Figure 2:
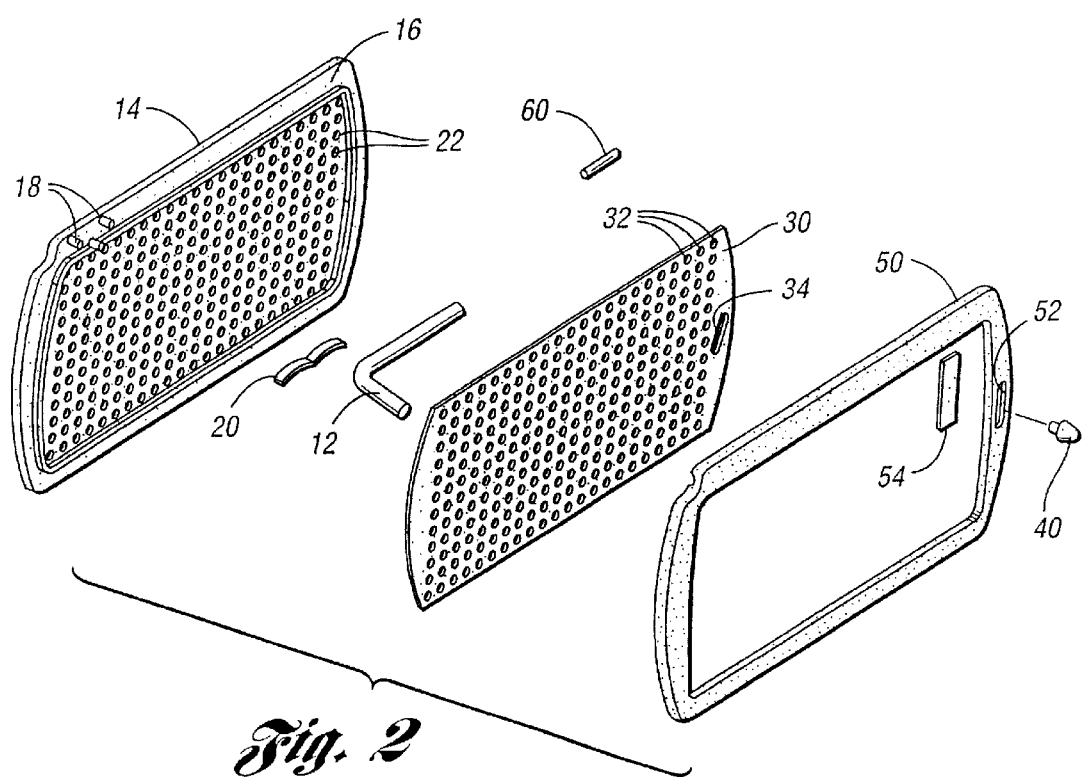
FIG. 2 is an exploded view of the sunscreen of the present invention.
Figure 3:
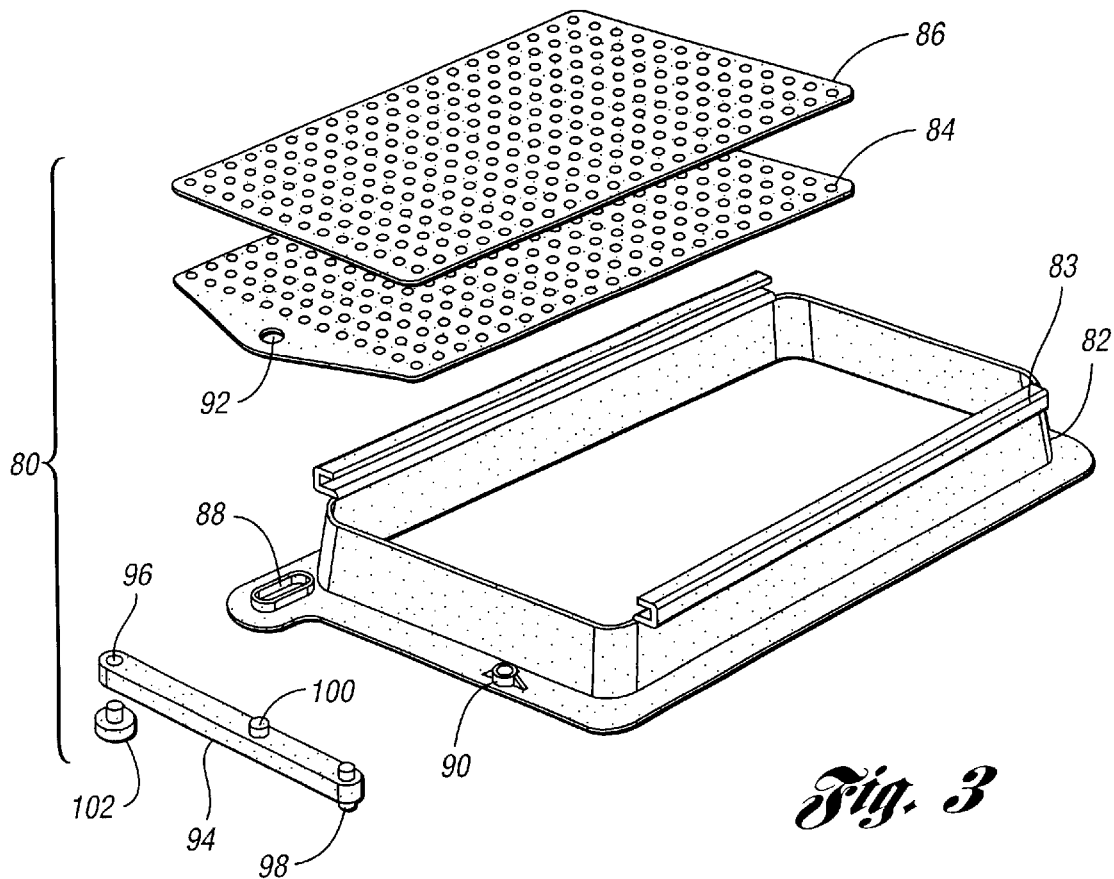
FIG. 3 is an exploded view of another embodiment of the sunscreen of the present invention.

Referring to FIGS. 1–3, the first embodiment of a variable sunscreen 10 is shown in accordance with the present invention. The variable sunscreen 10 includes a support arm 12 which supports the visor body 14 having a front surface 16. The visor body 14 is preferably injection-molded out of a plastic material such as polypropylene or polyacetal. Other materials, such as steel and aluminum, could also be used for the various components in the sunscreen. A plurality of protrusions 18 extend from the front surface 16 of the body and are adapted to receive a clip 20 which secures the support arm 12. The visor body 14 also has a plurality of apertures 22 formed therethrough. Preferably, the apertures 22 are formed during the injection molding process using a plurality of pins projecting from a mold. However, the apertures 22 could also be formed in a secondary operation using known boring techniques such as a laser or water jet cutting or stamping.

The sunscreen 10 also includes a blade 30 preferably injection-molded out of plastic such as polypropylene or polyacetal or other materials such as aluminum or steel. The blade 30 has a plurality of apertures 32 and a blade slot 34 therethrough. Preferably, the apertures 32 and blade slot 34 are made during the injection molding process although they also may be made during subsequent operations. As above, stamping may also be used to create the apertures.

A lever 40 is provided which is cooperable with the blade slot 34 to slide the blade 30 relative to the sunshade body 14 so that the apertures 32 in the blade move relative to the apertures 22 in the sunshade body to vary the opacity of the sunscreen 10.

A cover 50 is also provided to restrain the blade 30 relative to the sunshade body 14. The cover 50 is also preferably injection molded out of a plastic such as polypropylene or polyacetal. Similarly, the cover 50 could also be made out of other materials such as aluminum or steel. The cover 50 is preferably attached to the sunshade body 14 using a snap fit, although adhesive or other methods of attachment, such as sonic or vibration welding, are possible. The cover 50 has a slot 52 through which the lever 40 extends. A plate 54 on the back of the cover 50 may secure the lever 40 in place. The slot 52 in the frame is angled relative to the blade slot 34 to allow for relative movement. Preferably, the slot 52 in the cover 50 is essentially vertical and the blade slot 34 is approximately 30° from the vertical axis although other angles are possible.

The sunscreen also comprises a post 60 for securing the sunscreen 10 to a vehicle.

The support arm 12 is secured between the sunshade body 14 and the cover 50 such that the sunshade body and frame are pivotable about the attachment rod.

The apertures 22 in the sunshade body 14 and blade 30 can be either circular, quadrilateral, lengthened dots, or shaped otherwise.

The plurality of apertures 22 in the sunshade body 14 cover substantially all of the sunshade body and the plurality of apertures 32 in the blade 30 cover substantially all of the blade.

Figure 5:
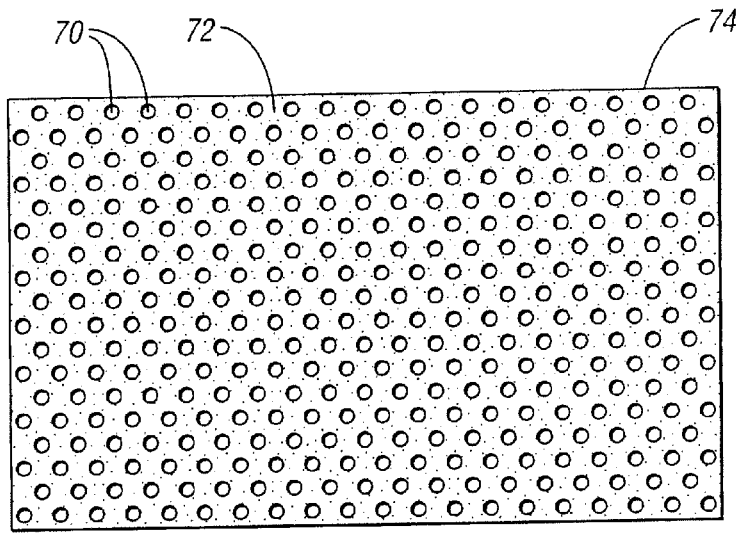
FIG. 5 is a view of the transparent and opaque portions of the visor body.
Figure 6:
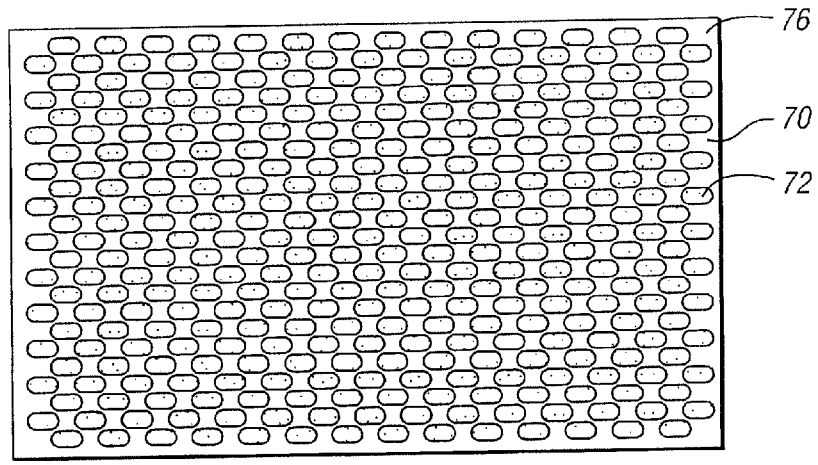
FIG. 6 is a view of the transparent and opaque portions of a blade of the present invention.

In another embodiment, the sunshade body 14 may have a matrix of transparent 70 and opaque 72 portions thereon and the blade 30 may have a matrix of transparent 70 and opaque 72 portions thereon, as shown, for example, in FIGS. 5 and 6. The transparent and opaque portions on the sunshade body may be made up of a hole matrix 74 (an opaque background 72 with a matrix of holes 70 silkscreened or otherwise applied on a transparent material), as shown in FIG. 5, or a silkscreened or otherwise applied dot matrix 76 on a transparent material, as shown in FIG. 6. The dot and hole patterns could also be applied by painting, printing, such as ink jet printing, or otherwise. Similarly, the transparent and opaque portions on the blade 30 can be made up of a hole matrix 74 on an opaque material or a silkscreened dot matrix 76 on a transparent material. When the dot matrix 76 is aligned with the hole matrix 74, the sun visor is 100% opaque. The dot matrix 76 may be adjusted to a position out of alignment with the hole matrix 74 such that variable opacity, up to approximately 80% can be achieved. By making the dots 72 of the dot matrix 76 at a slightly different horizontal spacing to the holes, the sunscreen 10 can be made to be opaque at one end and have a degree of transparency at the other end. Lengthening the dots 72 of the dot matrix 76 and re-spacing the holes 70 of the hole matrix 74 appropriately allows for a wider range of opacity effectively making half of the panel opaque (to block glare from one side) while allowing visibility through the other half.

Figure 7:
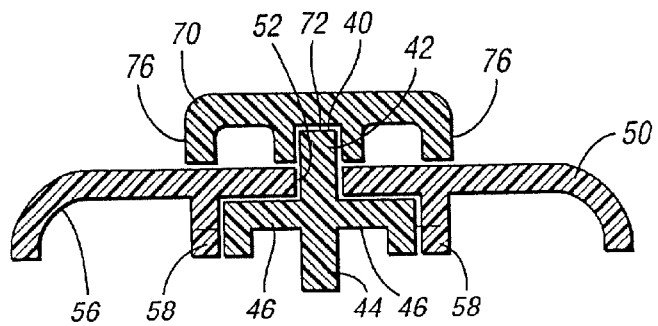
FIG. 7 is a cross sectional view of another embodiment of the sunscreen of the present invention.

Another design for the lever 40 is shown in a cross-sectional view in FIG. 7. The lever 40 is shown having a protrusion 42 extending through the cover slot 52 and having a portion 44 extendable into the blade slot 34 for adjusting the blade 30 relative to the cover 50. The lever 40 has at least one member 46 extending along the back surface 56 of the cover 50 to prevent the lever from coming through the slot 52. The back surface 56 of the cover 50 may have protrusions 58 extending therefrom to help align the lever 40. A cap 70 having a cavity 72 sized to fixedly receive the protrusion 42 slidingly secures the lever 40 relative to the cover 50. The cap 70 may further comprise a plurality of legs 76 to facilitate positioning of the cap.

Referring now to FIG. 3, a variable shade overhead panel or sunscreen 80 is shown. The sunscreen 80 comprises a body 82 adapted to be inserted into an opening in, for example, a vehicle roof (not shown). The sunscreen 80 has a first panel 84 having a matrix of transparent and opaque portions thereon as previously discussed. The first panel 84 has a panel aperture 92. The first panel 84 is attachable to the body 82 by slidably engaging in slots 83 in body 82. The sunscreen 80 also includes a second panel 86 having a matrix of transparent and opaque portions thereon as previously discussed The second panel 86 is retained relative to body 82 by snap fit, screws, pins or adhesive. The body 82 comprises at least one slot 88 and one pivot aperture 90. The sunscreen 80 further includes a lever 94 having an aperture 96, at least one pivot tab 98, and a panel tab 100 wherein the panel tab is inserted in the panel aperture 92, the pivot tab is inserted in the pivot aperture, and a fastener 102 is extended through the slot 88 in the body and into the aperture and the lever such that as the fastener 102 is moved within the slot and the lever about the pivot aperture, the panel tab causes one panel to move relative to the other panel.

The transparent and opaque portions on the first or second panels 84,86 can be made out of a hole matrix applied on a material, a dot matrix on a transparent material, or a plurality of apertures through an opaque body.

Alternatively, the second panel 86 may be an outer glass panel on the vehicle itself, such as a sunroof, having transparent and opaque portions as described above.

Apertures in the variable shade overhead panel 80 can allow for air flow and ventilation into the vehicle while providing shade.

Figure 4:
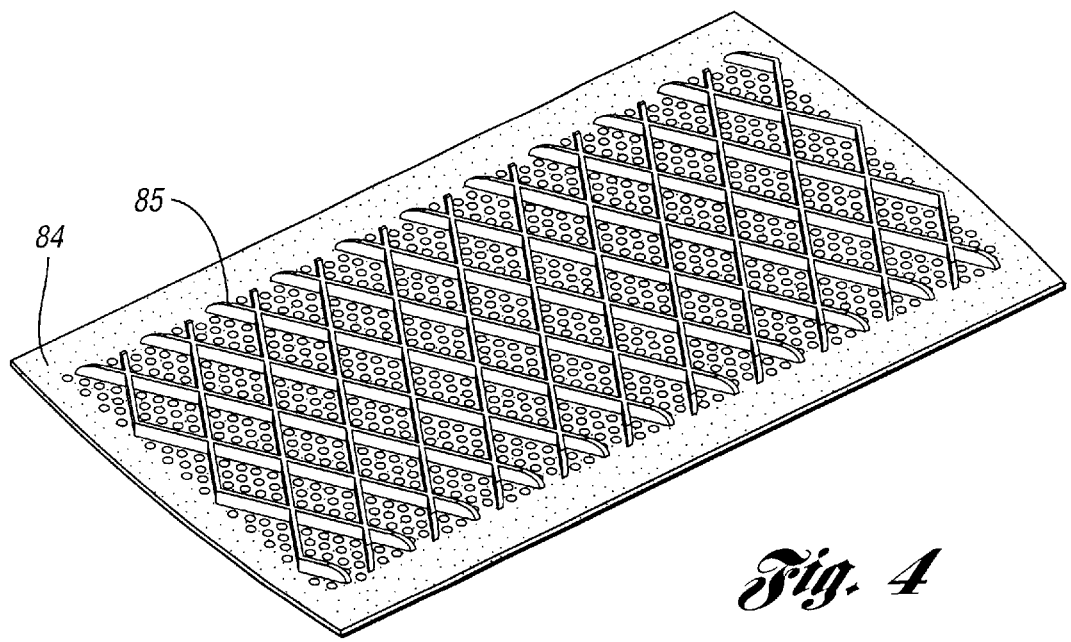
FIG. 4 is a perspective view of a panel according to one embodiment of the present invention.

Referring now to FIG. 4, a perspective view of the backside of an injection-molded panel 86 is shown having a plurality of ribs 85 extending therefrom. The ribs 85 provide structural rigidity and energy management in the event of an impact.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A variable opacity sunscreen comprising:
   a sun shade body having a plurality of apertures therethrough;
   a blade slidable relative to the sun shade body, the blade having a plurality of apertures and a blade slot therethrough; and
   a lever cooperable with the blade slot to slide the blade relative to the sun shade body so that the apertures in the blade move relative to the apertures in the sun shade body to vary the opacity of the sunscreen.

2. The sunscreen of claim 1 further comprising:
   a frame attachable to the sun shade body to restrain the blade relative to the sun shade body.

3. The sunscreen of claim 2 wherein the sun shade body, the blade, and the frame are injection molded out of plastic.

4. The sunscreen of claim 2 wherein the frame includes a slot angled relative to the slot in the blade, the lever designed to cooperate with the slot in the frame and the slot in the blade to slide the blade relative to the sun shade body and the frame.

5. The sunscreen of claim 4 wherein the slot in the frame is essentially vertical.

6. The sunscreen of claim 4 wherein the blade slot is angled at approximately 30 degrees relative to the frame slot.

7. The sunscreen of claim 2 further comprising:
   an attachment rod secured between the sun shade body and the frame, the attachment rod securable to a vehicle and wherein the sun shade body and frame are pivotable about the attachment rod.

8. The sunscreen of claim 1 wherein the plurality of apertures in the sun shade body cover substantially all of the sun shade body and the plurality of apertures in the blade cover substantially all of the blade.

9. The sunscreen of claim 2 wherein the sun shade body and the frame are snap fit together.

10. The sunscreen of claim 1 further comprising:
    a sliding pin attachable to an inner frame surface to secure the lever to the sunscreen.

11. A variable opacity sunscreen comprising:
    a sun shade body having a matrix of transparent and opaque portions thereon;
    a blade slidable relative to the sun shade body, the blade having a matrix of transparent and opaque portions thereon and a blade slot therethrough; and
    a lever cooperable with the blade slot to slide the blade relative to the sun shade body so that the matrices of transparent and opaque portions move relative to each other to vary the opacity of the sunscreen.

12. The variable sunscreen of claim 11 further comprising:
a frame attachable to the sun shade body to restrain the blade relative to the sun shade body.

13. The variable sunscreen of claim 11 wherein the transparent and opaque portions on the sun shade body are made up of a hole matrix pattern applied on transparent material.

14. The variable sunscreen of claim 11 wherein the transparent and opaque portions on the blade are made up of a dot matrix pattern applied on transparent material.

15. The variable sunscreen of claim 11 wherein the transparent and opaque portions on the blade are made up of a hole matrix pattern applied on transparent material.

16. The variable sunscreen of claim 11 wherein the transparent and opaque portions on the sun shade body are made up of a dot matrix pattern applied on a transparent material.

17. The variable sunscreen of claim 11 wherein at least one of the transparent portions is a plurality of apertures through an opaque body.

18. The variable sunscreen of claim 11 wherein one of the matrices of transparent and opaque portions is a dot matrix on a transparent material and the other of the matrices is a hole matrix on transparent material, wherein the dots are lengthened.

19. A variable opacity sunscreen for a vehicle having a roof with an opening, the sunscreen comprising:
a body adapted to be inserted into the opening;
a first panel having a matrix of transparent and opaque portions thereon, the first panel attachable to the body;
a second panel having a matrix of transparent and opaque portions thereon; the second panel retained relative to the first panel; and
a lever to move one panel relative to the other panel such that the matrices of transparent and opaque portions move relative to each other and vary the opacity of the sunscreen.

20. The variable sunscreen of claim 19 wherein at least one of the transparent and opaque portions is made up of a hole matrix pattern applied on transparent material.

21. The variable sunscreen of claim 19 wherein at least one of the transparent and opaque portions is made up of a dot matrix pattern-applied on a transparent material.

22. The variable sunscreen of claim 19 wherein at least one of the transparent portions is a plurality of apertures through an opaque body.

23. The variable sunscreen of claim 19
wherein the variable sunscreen further comprises a fastener;
wherein the lever comprises an aperture, at least one pivot tab, and a panel tab;
wherein the body comprises a slot and at least one pivot aperture;
wherein one of the first or second panels has an aperture adapted to receive the panel tab; and
wherein the at least one pivot tab is inserted in the at least one pivot aperture, the panel tab is inserted in the panel aperture; and the fastener extends through the slot in the body and into the aperture in the lever such that as the fastener is moved within the slot, the lever pivots about the pivot aperture and the panel tab causes one panel to move relative to the other panel.

24. The variable sunscreen of claim 19 wherein at least one of the panels is injection molded out of plastic and further includes a plurality of ribs extending therefrom.

25. The variable sunscreen of claim 19 wherein one of the matrices of transparent and opaque portions is a dot matrix pattern on a transparent material and the other of the matrices is a hole matrix pattern applied on a material, wherein the dots are lengthened.

26. A variable opacity sunscreen for an automotive vehicle having an outer glass panel having a matrix of transparent and opaque portions thereon and a vehicle roof having an opening, the sunscreen comprising:
a body adapted to be inserted into the opening;
a first panel having a matrix of transparent and opaque portions thereon, the first panel attachable to the body; and
a lever to move the first panel relative to the glass panel such that the matrices of transparent and opaque portions move relative to each other to vary the opacity of the sunscreen.

* * * * *